US011715067B2

(12) United States Patent
Romano et al.

(10) Patent No.: US 11,715,067 B2
(45) Date of Patent: Aug. 1, 2023

(54) SYSTEM AND METHOD FOR CUSTOMER TOUCHPOINT MANAGEMENT

(75) Inventors: Nick Romano, Toronto (CA); Steve Biancaniello, Mississauga (CA); Kevin Dougan, Mississauga (CA); Steve Mayers, Oshawa (CA); Eric Scholey, Burlington (CA); Jeff Janssen, Kitchener (CA)

(73) Assignee: MESSAGEPOINT INC., Toronto (CA)

(*) Notice: Subject to any disclaimer, the term of this patent is extended or adjusted under 35 U.S.C. 154(b) by 930 days.

(21) Appl. No.: 11/828,911

(22) Filed: Jul. 26, 2007

(65) Prior Publication Data
US 2008/0046267 A1    Feb. 21, 2008

Related U.S. Application Data

(60) Provisional application No. 60/833,957, filed on Jul. 28, 2006.

(51) Int. Cl.
*G06Q 10/10* (2023.01)
*G06Q 10/06* (2023.01)

(52) U.S. Cl.
CPC ............ *G06Q 10/10* (2013.01); *G06Q 10/06* (2013.01)

(58) Field of Classification Search
CPC ..... G06Q 10/10; G06Q 10/06; G06Q 30/0271
USPC .......... 705/14.4, 14.41, 14.42, 14.43, 14.49, 705/14.52, 14.66, 14.67, 14.72
See application file for complete search history.

(56) References Cited

U.S. PATENT DOCUMENTS

| | | | | |
|---|---|---|---|---|
| 6,073,112 A | * | 6/2000 | Geerlings | G06Q 30/0269 705/14.66 |
| 7,343,294 B1 | * | 3/2008 | Sandholm | G06Q 30/0201 705/7.29 |
| 2002/0112035 A1 | * | 8/2002 | Carey | G06F 16/958 709/219 |
| 2002/0152244 A1 | * | 10/2002 | Dean | G06F 40/154 715/255 |
| 2004/0103017 A1 | * | 5/2004 | Reed | G06Q 10/0637 705/14.42 |
| 2006/0231614 A1 | * | 10/2006 | Walker | G07F 17/16 705/14.65 |
| 2007/0050246 A1 | * | 3/2007 | Talavera | G06Q 30/0264 705/14.56 |

* cited by examiner

*Primary Examiner* — John Van Bramer
(74) *Attorney, Agent, or Firm* — Richard F. Kurz; Haug Partners LLP

(57) ABSTRACT

An automated method for managing, delivering and tracking dynamic content. The method includes processing customer data related to one or more customers, managing and selecting textual and graphical dynamic content to specify delivery to targeted subsets of customers as a function of business rules, and delivering that content to targeted subsets of customers via one or more appropriate customer touchpoints. A portion or location within the customer touchpoint is identified as a dynamic destination area for receipt of the selected content, which then contains that content qualified for delivery to the targeted subset of customers via the customer touchpoint dynamic destination area through execution of targeting business rules. The qualification, delivery and responses to the delivered content are tracked for each customer, across each touchpoint, and targeting rules are refined and updated to encompass past qualification, delivery, and responses.

6 Claims, 12 Drawing Sheets

600

Step it up!
Define your retirement goals in three easy steps. Steps is designed to make planning your retirement a simple, comfortable activity. Steps let your estimate how much money you will need to continue to meet your retirement income goal then easily outlines a path to get you there. You'll see an estimate of your projected annual retirement income on page 2 of your statement. The estimate is based on details you provide about your current retirement goals when you enrolled. The more information you provide about your personal retirement goals though, the better the details you'll receive on how you are tracking toward achieving them. Steps will tell you whether you are on track to achieve your goals. If you aren't, Steps will suggest changes to help take you in the right direction.

Step 1- Set your annual retirement income goal – Estimate how much money you will need to save to generate your annual retirement income.
Step 2- Create a plan – Create a savings plan to help you reach the annual retirement income goal you set in Step 1.
Step 3- Track your progress- Check that your retirement plan is on track at least once a year. Step 3 will help you stay on track.
You've now created a retirement goal that can help you experience the retirement lifestyle you want.
To set a goal, simply log in to the plan member secure website at www.checkfirstinvestments.com.

650

640

Save more, spend less
Do you feel like no matter how much money you make. You always seem to spend more? When you have credit card, rent or mortgage payments, bills and groceries to pay for, spending is so easy. The trick is to spend less. And spending less money can be easier than you think. If, for example, you brought one less coffee per day, you'd save about $1.50 per day which is a savings of approximately $550 a year! Just imagine how much you'd end up within 10 years if you then invested that money instead. You may find that day-to-day purchases like buying lunch at work every day can account for a surprising amount of the money you spend. Knowing where your money goes can help you find money to invest for your retirement. Put together a budget.

Try our Budget Planning and Tracking Tool at www.checkfirstinvestments.com to help you build a budget and track your expenses on a weekly basis. The first step to saving is to know where you are spending!

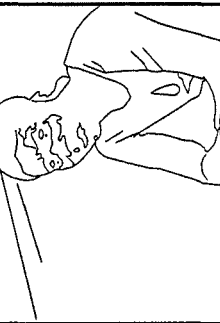
652

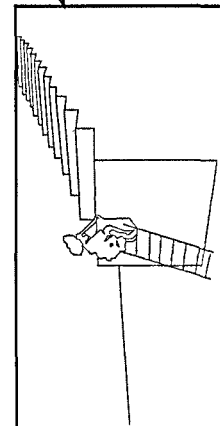
642

FIG. 6

SYSTEM AND METHOD FOR CUSTOMER TOUCHPOINT MANAGEMENT

CROSS REFERENCE TO RELATED APPLICATIONS

This application claims a domestic priority benefit to provisional application U.S. Ser. No. 60/833,957 filed Jul. 28, 2006, which is hereby incorporated by reference in its entirety herein.

BACKGROUND

1. Field of the Invention

This invention relates generally to a system and method of providing customer touch point management ("CTM") and, more particularly, to a system and method of providing a marketing campaign and message planning, analysis deliver, testing and simulation tool for marketing and product managers.

2. Background Discussion

Typically, large businesses with a large customer population (for example, the financial services, banking, health care, retail, utilities, telecommunications and insurance industries) are challenged with the content and volume and one-to-one personalization of information that they convey to their prospects and customers—whether it be through a physical document (i.e., paper), electronic document, or an online (e.g., Internet, network, web-based), telephone or face-to-face interaction. These points of contact between a customer and a business or its product are known as customer touch points. As the number of customer touch points a business attempts to manage increases, and as the volume of information conveyed through these touch points increases, so does the challenge of managing them. Businesses are recognizing that customer interactions are made more effective by providing relevant, personalized information to their customers during interactions rather than standard, boiler-plate content, which adds to the management challenge. Moreover, to improve businesses' customer relationships, there is a need to better manage these customer touch points. Such management is also known as Customer Touchpoint Management ("CTM").

Key challenges in enabling CTM include providing content owners (typically marketing departments) is the ability to effectively manage the authoring, approval, delivery, measurement and optimization of message content, and the ability to manage this content in one place even though it may be delivered across multiple channels.

To effectively implement an advanced messaging strategy, personnel are typically required to interact with multiple systems, tools and departments to get even the simplest messages implemented, let alone refreshed regularly.

In addition, currently there are not clearly-defined procedures for managing and approving the content. For example, businesses may manage and control hundreds of messages using such tools as a word processor or a spreadsheet (e.g., MS Word® or MS Excel®, MS Words and MS Excel® are registered trademarks of Microsoft Corporation, Redmond Wash.). Approving the message content is typically an ad hoc process that is difficult to enforce. Furthermore, the ability to preview message content is often tied to an information technology (IT) testing cycle. It is difficult to track changes, identify version content or even track which customers received what message content. With such ad hoc methods it can take lead times of months to implement a new message in a marketing campaign. Companies can be discouraged by many of the above obstacles from even trying to implement the marketing campaigns and strategies needed to drive their businesses.

SUMMARY OF THE INVENTION

The summary provided below is presented merely to provide the reader with a brief summary of certain forms the invention might take and that this summary is not intended to limit the scope of the invention. Indeed, the invention may encompass a variety of embodiments that may not be set forth below.

The present invention is directed toward a system and method for customer touchpoint management that bridges the gaps between customer data and content systems and content delivery systems.

Accordingly, one embodiment of the present invention is directed to an automated method for managing, delivering and tracking dynamic content. The method includes processing customer data related to one or more customers. Textual and graphical dynamic content are managed and selected content is specified for delivery to a targeted subset of customers as a function of targeting business rules defined to be applied to the customer data. The selected content is specified for delivery to the targeted subset of customers via one or more appropriate customer touchpoints. A portion or location within the customer touchpoint is identified as a dynamic destination area for receipt of the selected content. The selected content is qualified for delivery to the targeted subset of customers via the dynamic destination area of the customer touchpoint through the execution of the targeting business rules applied to customer data. The selected content is delivered to the subset of customers via the defined one or more appropriate customer touchpoints. The qualification, delivery and responses to the delivered content, are tracked for each customer, across each touchpoint. Refining and updating the targeting rules for qualifying content delivery to encompass the past qualification, delivery and responses of prior content is also performed.

Another embodiment of the present invention is directed to authoring, updating, previewing, testing and approving the selected dynamic content. The updated dynamic content is delivered to the targeted subset of customers via one or more appropriate customer touchpoints.

Another embodiment of the present invention is directed to the method as described above and the processed customer data comprises customer parameters that uniquely identify each customer (i.e. customer ID, name, account numbers etc.) and/or identify characteristics and past behaviors of the customer useful for classifying the customer into one or more customer segments useful for targeted marketing (i.e. customer age, sex, income level, specific investment holdings, past responses to marketing offers etc.).

Another embodiment of the present invention is directed to the method described above wherein the profile data includes customer age, customer income, and customer asset information.

Another embodiment of the present invention is directed to the method described above wherein the step of identifying the one or more customer touchpoints to be used to deliver the content is based on the appropriateness of the touchpoint as determined by a user of the automated process/system.

Another embodiment of the present invention is directed to the method described above wherein the customer touchpoints include:

direct mailings, including compliance documents such as statements and confirmation documents physical inserts delivered within a direct mailing or compliance document electronically delivered versions of these compliance documents ad hoc letters email communications web pages delivered to authenticated users inbound and outbound customers service conversations interactive voice response (IVR) system interactions kiosk or ATM-based system interactions point-of-sale (POS) terminal interactions SMS or mobile device based communications Instant messaging based communications Another embodiment of the present invention is directed to the method described above and also includes:

identifying a portion of the touchpoint medium as a static area.

Another embodiment of the present invention is directed to the method described above and also includes:

accessing graphic data;

selecting a portion of the graphic data based on the customer data; and embedding the selected graphic data into the dynamic area of the touchpoint medium.

Another embodiment of the present invention is directed to the method described above and also includes:

updating the updating the selected graphic data; and providing the updated selected graphic data to the one or more customers via the touchpoint medium.

Another embodiment of the present invention is directed to the method described above and also includes:

establishing a date-based effectivity window;

associating the date-based effectivity window with the selected content data; and providing the selected content to targeted customers via the one or more customer touchpoints based on the date-based effectivity window.

Another embodiment of the present invention is directed to the method described above and also includes:

establishing a set of customer-based preference parameters;

providing a mechanism for updating and managing the customer-based preference parameters allowing targeting business rules to be defined for the qualification of selected dynamic content to be predicated on these customer-based preference parameters and providing the selected content to targeted customers via the one or more customer touchpoints based on these customer-based preference parameters.

Another embodiment of the present invention is directed to a method of for generating a script that includes:

placing a telephone call from a calling station to a called station;

accessing customer data related to a customer associated with the called station;

accessing script data;

accessing content data;

associating selected content data with the customer data;

identifying a portion of the script data as a dynamic portion, embedding the selected content data into the dynamic portion of the script data; and providing the selected content data to the customer as a part of the script data.

Another embodiment of the present invention is directed to a method of previewing the delivery of selected dynamic content including:

allowing the content author to select dynamic content to preview in a selected customer touchpoint automatically, and in near real time, delivering the selected dynamic content to the delivery system for the selected customer touchpoint, along with test customer data for one customer automatically, and in near real time, receiving back from the delivery system for the selected customer touchpoint, a viewable output file in which the selected content is delivered in a format as the end customer would see it Another embodiment of the present invention is directed to a method of testing the qualification and delivery of selected dynamic content comprising:

allowing a tester to upload multiple test files of customer data allowing the tester to select dynamic content to test in a selected customer touchpoint, with a selected customer test data file automatically, and in near, real time, delivering the selected dynamic content to the delivery system for the selected customer touchpoint, along with the selected customer test data file automatically, and in near real time, receiving back from the delivery system for the selected customer touchpoint, 1) a viewable output file in which all selected dynamic content is delivered to the appropriate customers as determined by the application of the targeting business rules for each piece of content, and the selected content is delivered in a format as the end customer would see it, and 2) an output data file detailing which customers in the selected test data file qualified for and were delivered each piece of selected dynamic content Another embodiment of the present invention is directed to a method of simulating the qualification and delivery of selected dynamic content comprising:

allowing a tester to manage historical files of production customer data allowing the test to select dynamic content to simulated in a selected customer touchpoint, with a selected set of production customer data automatically delivering the selected dynamic content to the delivery system for the selected customer touchpoint, along with the selected production customer data automatically receiving back from the delivery system for the selected customer touchpoint an output data file detailing which customers in the selected production customer data would have qualified for and would have been delivered each piece of selected dynamic content Another embodiment of the present invention is directed to a method of tracking the qualification, delivery and responses received to the delivery of selected dynamic content comprising:

providing a mechanism for the execution of qualifying business rules to generate an output data file detailing which customers in production qualified or did not qualify for each piece of dynamic content providing a mechanism for customer touchpoint delivery systems to generate an output data file detailing which customers in production were delivered or not delivered each piece of dynamic content providing a mechanism for software systems to generate an output data file detailing which customers responded to a piece of delivered dynamic content providing a mechanism for reporting on which customers qualified for, were delivered, and/or responded to selected dynamic content, across one or more selected customer touchpoints, within a defined date range

BRIEF DESCRIPTION OF THE DRAWINGS

Embodiments of the present invention are described with reference to the following detailed description and upon reference to the drawings in which:

FIGS. 6-9 illustrate an example of web pages according to an embodiment of the present invention;

DETAILED DESCRIPTION

The present invention relates to planning and managing customer messages by establishing a plan (including timeline) for integrated messaging campaigns and by managing message delivery across multiple customer touch points. Touchpoints are a channel, point of contact or way to communicate with a user, such as a customer, potential customer, client, or individuals or organizations one would like to disseminate information to. Examples of touchpoints are print media, websites, email, mailing of mail pieces, telephone conversations information displayed at a kiosk, advertising such as billboards outside overhead displays, compliance documents and any other channel for providing information to a target audience.

Message delivery may be controlled by authoring message content once and defining targeting criteria. Messages tracking functions are provided that may track which messages were communicated to which customers, which customers responded to which messages, and test content by creating scenarios with prior customer data.

Messages may be improved and reinforced by testing message and campaign effectiveness before they are active, by modelling message distribution and delivery costs, by reporting on which messages were more successful, and by targeting new messages based on past customer activity, responses or behaviours.

Figure 1:
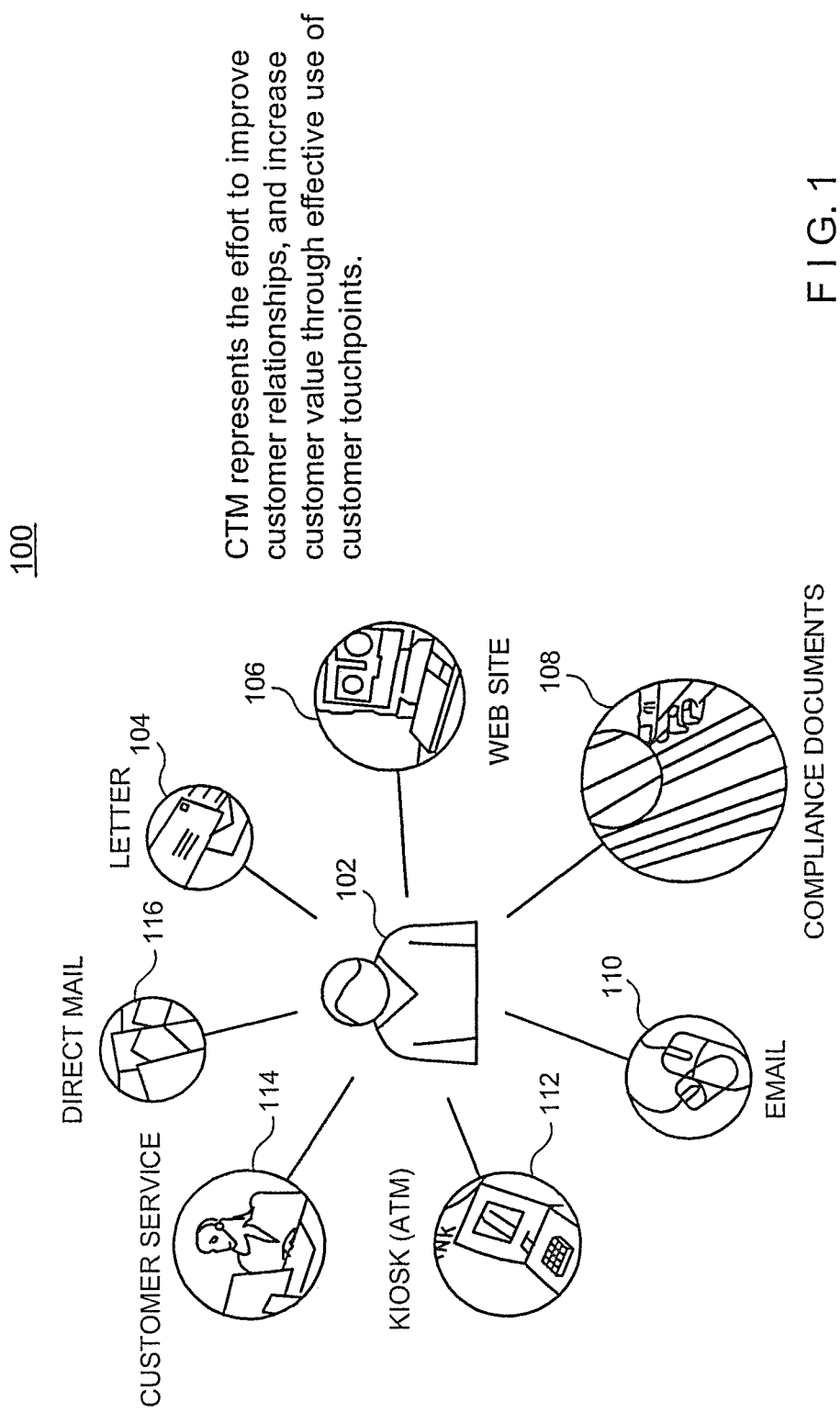
FIG. 1 illustrates a perspective view of a customer and a plurality of touchpoints.

FIG. 1 illustrates a perspective view of a customer and a plurality of touchpoints. As shown in FIG. 1, system 100 shows that customer 102 may be exposed to information via a letter 104, a website 106, compliance documents 108, email 110, a kiosk, or ATM (automatic teller machine) 110, a customer service representative calling 114 or direct mail 116. The manner in which a customer, or user, or target audience is exposed to information is a touchpoint.

Figure 2:
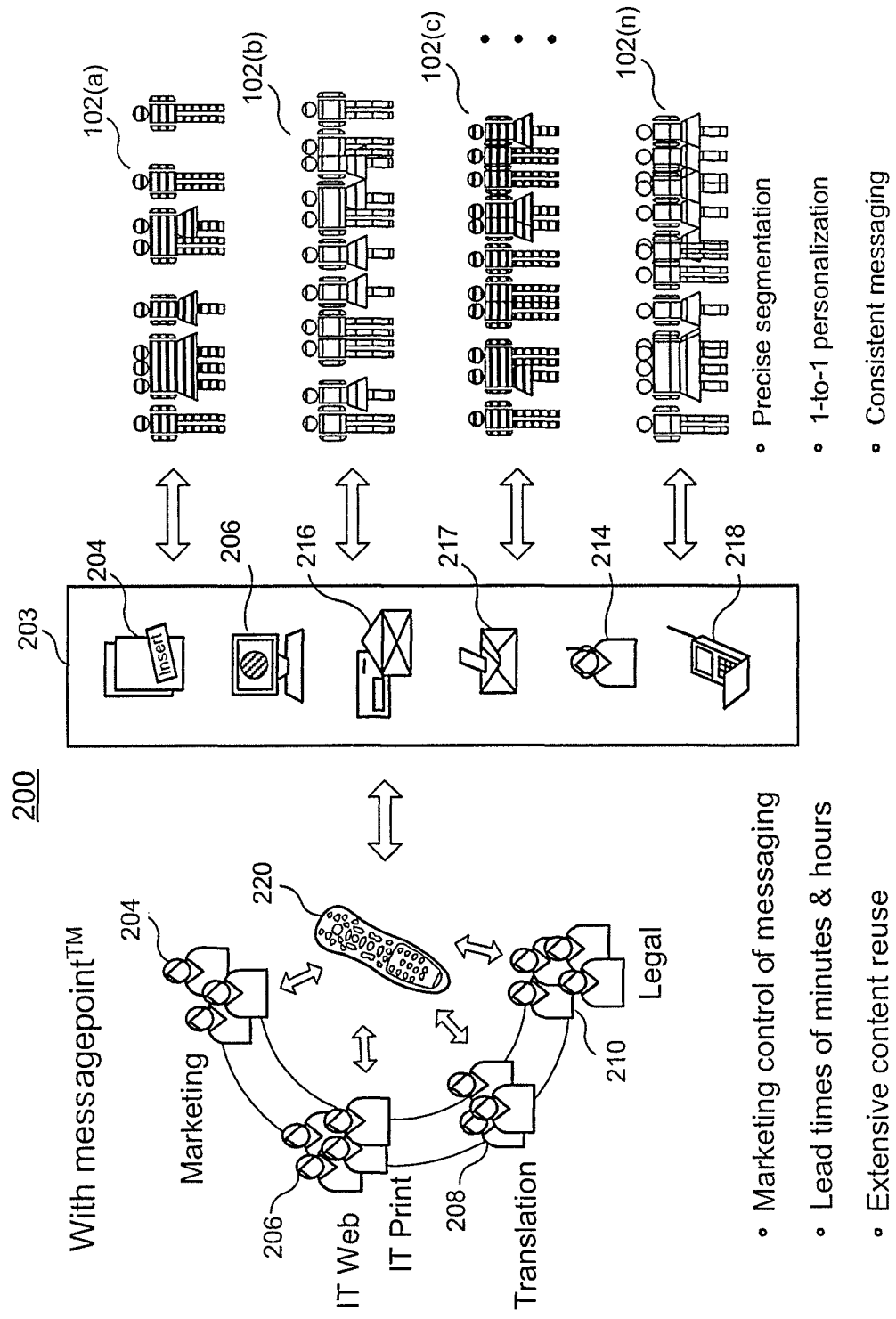
FIG. 2 illustrates a perspective view of providing data to a plurality of customers.

FIG. 2 illustrates a perspective view of a system 200 used to provide data to a plurality of customers or members of a target audience. For example, a content provider may include entities such as marketing personnel 204, information technology (IT) web and IT print personnel 206, translation personnel 208, and legal personnel 210, which all contribute, or have editing responsibility to determine the content of information provided to audience members 102(a) . . . (n) where "n" is virtually any number of people who come into contact with the provided information.

The information generated, edited and/or revised by content provider parties 204, 206, 208 and 210 is accumulated at station 220 and then disseminated via one or more touchpoints, shown collectively as 203. The touchpoints 202 include an insert 204, a web page 206, a commercially generated mailpiece 216, a letter 217, a telephone call 214 and/or a broadcast 218. The target audience (generally 102) is identified by the touchpoint used to reach a particular segment 102(a) . . . (n).

Figure 3:
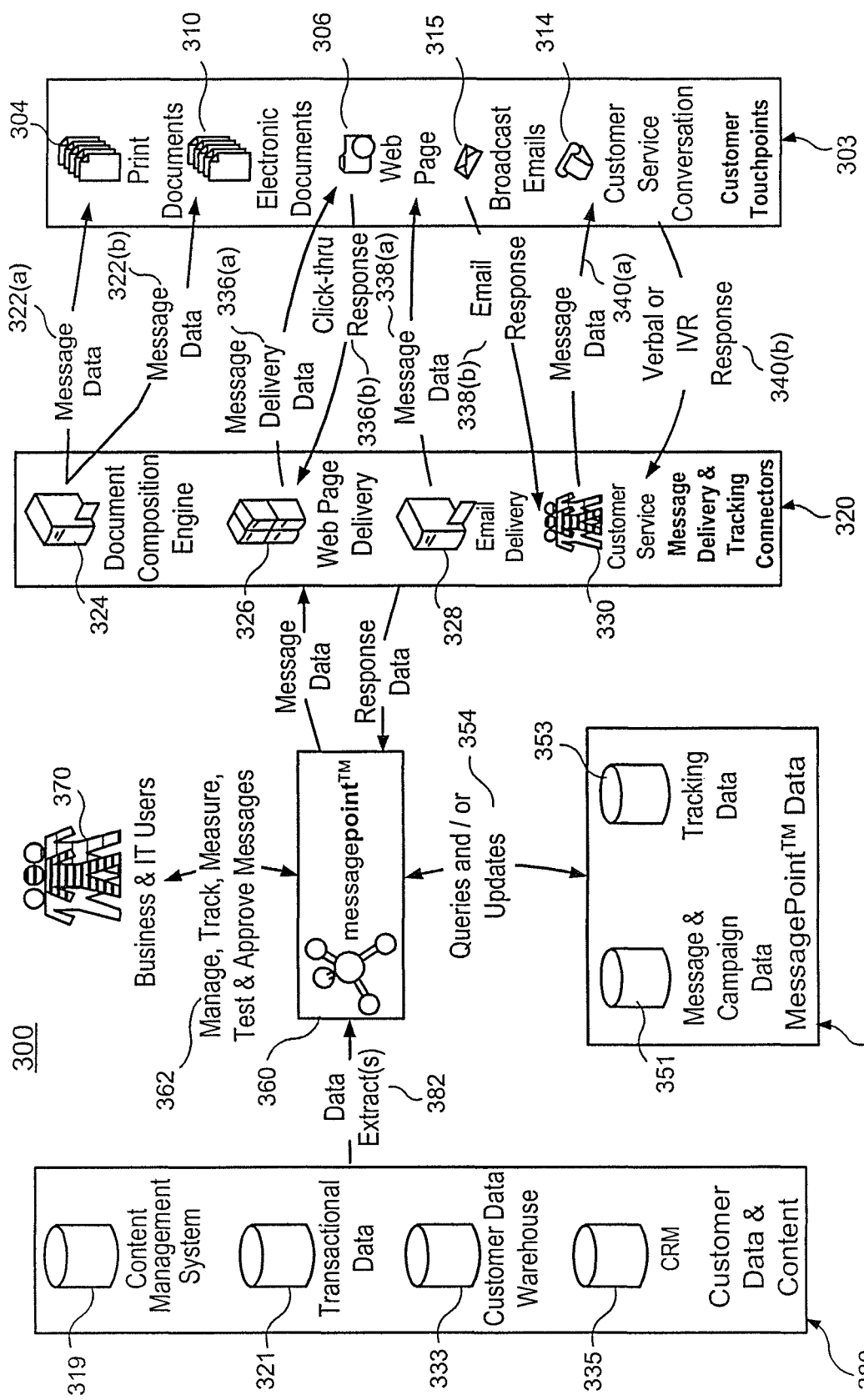
FIG. 3 illustrates one embodiment of providing data using a plurality of touchpoints.

FIG. 3 illustrates one embodiment of providing data using a plurality of touchpoints. As shown in FIG. 3, system 300 includes customer data and content module 380, business and IT users 370, message point module 360, data module 350, message delivery and tracking connectors 320 and customer touchpoints 311. Each of these is described in more detail below.

Customer data and content module 380 stores and provides customer data such as customer name, address income level, net worth, asset allocation, transactional history e.g. number and frequency of investments or trades etc. The customer data and content module includes a content management system module 319, transactional data module 321, customer data warehouse module 333 and CRM module 335.

Content management system module 319 is used to manage and manipulate the content data. Transactional data module 321 is used to store transactional data related to a user or customer or member of a target audience. This transactional data may include, for example, the frequency and number of financial transactions executed by a particular user. The value of the various transactions, amount of gain or loss and other transactional data may also be stored in transactional data module 321. Customer data warehouse module 333 stores various data related to a customer. CRM module 335 is used for customer relationship management ("CRM"), and typically stores a history of customer interactions and behaviours, along with efforts to segment an organization's customer base into logically separate groups based on their history of interactions and behaviours. The data from customer data and content module 380 is provided to messagepoint module 360 via communication channel 382, which is typically a bi-directional communication bus or other transmission medium.

Business and IT users 370 are typically business management personnel and/or IT personnel that interface with the customer data and edit, revise, measure, approve, test and track the dynamic message content. The revisions or approvals of the messages are provided to the messagepoint module 360 via bi-directional communication channel or bus 362.

Messagepoint module 360 is a processing module with sufficient memory capacity and processing speed to manipulate the received data and output data to other modules as described herein. For example, messagepoint module 360 receives data from customer data and content module 380. The received data is used to generate message and qualification data that is provided to customer touchpoints 303.

The messagepoint module 360 utilizes customer data and profile data as well as message and campaign data 351 and tracking data 353, accessed from messagepoint data module 350 to generate the message data and qualification data. The messagepoint module 360 is also in bidirectional communication with business and IT personnel 370 and incorporates input from them to generate the message data that is provided to message delivery and tracking connectors, shown collectively as 320, which provide the message data to selected touchpoints 303. The determination of the selected touchpoints 303 is made by messagepoint module 360.

Data module 350 is in bidirectional communication with messagepoint module 360 via bidirectional communication channel 354. The messagepoint data module 350 includes message and campaign data module 351, which stores data related to a particular advertising campaign, and tracking data module 353, which stores tracking data relating to feedback from customers or other information relating to who received the message data, who responded to the message data and what the response was.

Message delivery and tracking connectors 320 provide an interface between messagepoint module 360 and touchpoints 303. The message delivery and tracking connectors 320 include document composition engine module 324, web page delivery module 326, email delivery module 328, and customer service representatives 330.

Document composition engine module 324 is typically a processing system or tool that takes one or more files as inputs and generates as outputs one or more formats of composed output, such as AFP print streams for printing via high volume printers, or PDF outputs for archiving or electronic delivery. Each of these composed output formats ultimately to be delivered to customers either electronically or via mail may include dynamic message content authored by messagepoint module 360 and delivered to the document composition engine by an appropriate document composition connector. Depending on the specific functional differences from one document composition engine to the next, each document composition connector will be specific to the document composition engine it has been designed to connect to.

Web page delivery module 326 is typically a processing module that generates and delivers web page data that includes the message data generated by messagepoint module 360. Similarly email delivery module 328 generates and delivers an email including the message data.

Customer service personnel 330 can contact a member of the target audience via telephone. A script can be generated by messagepoint module 360 that is customized or tailored to a particular member of the target audience. The customer service personnel 330 can use the script during the telephone conversation and convey the message data.

Customer touchpoints 303 include print documents 304, electronic documents 310, web page 306, broadcast emails 315 and telephone conversation 314. The touchpoints 303 are in communication with message delivery and tracking connector module 320. For example, message data is conveyed from document composition engine module 324 to print documents touchpoint 304 as shown by transmission path 322(a). Message data is also conveyed from document composition engine module 324 to electronic documents touchpoint 310 as shown by transmission path 322(b).

Message data may be conveyed from web page delivery module 326 to web page touchpoint 306 as shown by transmission path 336(a). The web page touchpoint 306 then displays the message data to members of the target audience, i.e., audience members viewing the webpage. Response data may be transmitted from web page touchpoint 306 to web page delivery module 326 via transmission path 336(b). The response data may be input received from members of the target audience who have viewed the message data and provided a comment, request for additional information or other feedback.

Message data is also conveyed from email delivery module 328 to broadcast email touchpoint 315 as shown by transmission path 338(a). Email response data may be transmitted from broadcast email touchpoint 315 to message delivery and tracking connector module 320, and specifically to customer service personnel 330 via transmission path 338(b). The response data may be input received from members of the target audience who have received the broadcast email and provided a comment, request for additional information or other feedback.

Message data is also conveyed from customer service representatives 330 to telephone customer touchpoint 314 as shown by transmission path 340(a). Response data is received from telephone customer touchpoint 314 via transmission path 340(b). This response data is typically in the form of a telephone conversation since the touchpoint 314 is a telephone.

Figure 4:
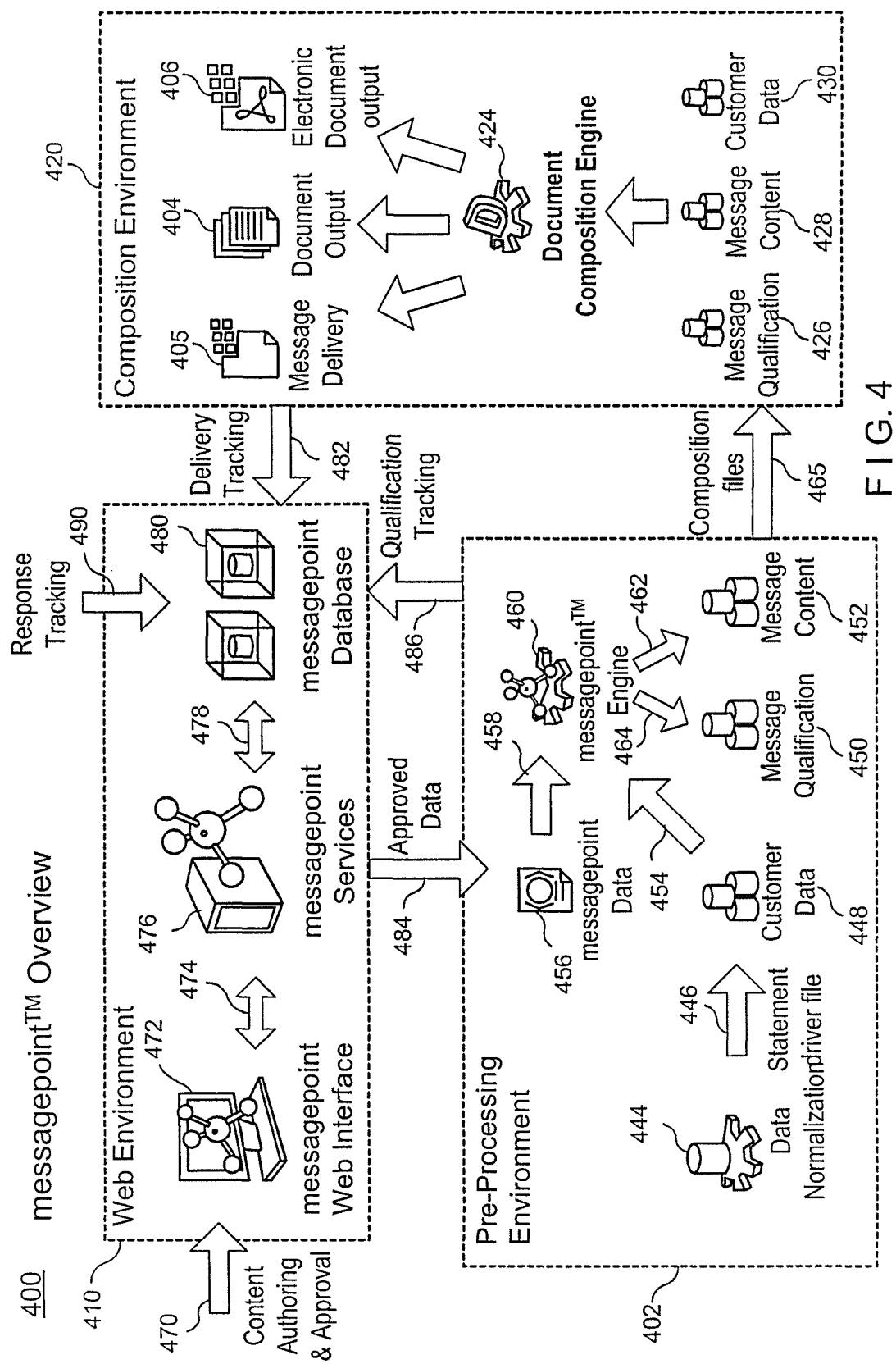
FIG. 4 illustrates an embodiment of the present invention that utilizes a document composition engine.

FIG. 4 illustrates an embodiment 400 of the present invention that utilizes a document composition engine. As shown in FIG. 4, system 400 shows a pre-processing module 402, composition module 420 and web module 410.

Pre-processing module 402 is typically triggered by a data extraction and normalization process 444 which may be comprised of interfacing with one or more source customer data systems, extracting, cleansing, normalizing and/or processing this data into a format acceptable for downstream processing. Statement driver file module 446 provides the resultant normalized data file(s) 448 from data normalization module 444 to messagepoint engine module 460 via channel 454.

Statement driver file module 446 provides the resultant normalized data from data normalization module 444 to customer data module 448. The customer data is provided to messagepoint engine module 460 via channel 454.

Approved data is provided from web environment module 410, as shown by channel 484. The approved data is comprised of dynamic message content and targeting business rules data that has been approved for transmission to members of the target audience. Qualification tracking is transmitted from pre-processing module 402 to web module 410 via channel 486. The qualification tracking shows that business users can view statistics and measure the performance of their messages and campaigns across all touchpoints and channels. This feature integrates with existing CRM infrastructures to optimize advanced customer analytics. Tracking of messages delivered includes message variables and parameters for both customer service and legal compliance. This allows the exact dynamic message content to be reconstituted and tracked to prove that a) specific intended customers were indeed delivered certain messages, and b) exactly what the content of the delivered messages was.

The messagepoint engine module 460 also receives message data from messagepoint data module 456 via channel 458. The messagepoint engine module 460 generates message data and provides the message data to message qualification module 450 via channel 464 and message content module 452 via channel 462.

The message data is the transmitted to composition module 420 via channel 465.

Composition module 420 receives composition files from pr-processing module 402 and stores the files in one of a plurality of storage units. These storage units include message qualification memory 426, message content memory 428 and customer data memory 430. These memory, or storage units, 426, 428 and 430 provide data to document composition engine module 424.

The document composition engine module 424 utilizes the provided information and identifies one or more appropriate touchpoints to transmit the message data. For example, FIG. 4 shows message delivery touchpoint 405, document output touchpoint 404 and electronic document output 406.

Delivery tracking information is provided from customer touchpoints 404, 405 and 406 to web module 410 via channel 482. The tracking information is based on feedback from customers at the touchpoints 404, 405 and 406.

The feedback data is received by web module 410. The web module 410 also receives content authoring and approval data via channel 470. Messagepoint web interface 472 is typically a GUI that is in bidirectional communication with messagepoint services module 476. Messagepoint services module 476 also communicates with messagepoint database module 480 via bidirectional communication channel 478. The messagepoint services module 476 generates message data, which has been approved and provides the message data to pre-processing module 402. Messagepoint database 480 stores data that is used to generate the message data. Response tracking data 490 is also provided to the web module 410. The response tracking data is also used to generate and/or edit the message data.

Figure 5:
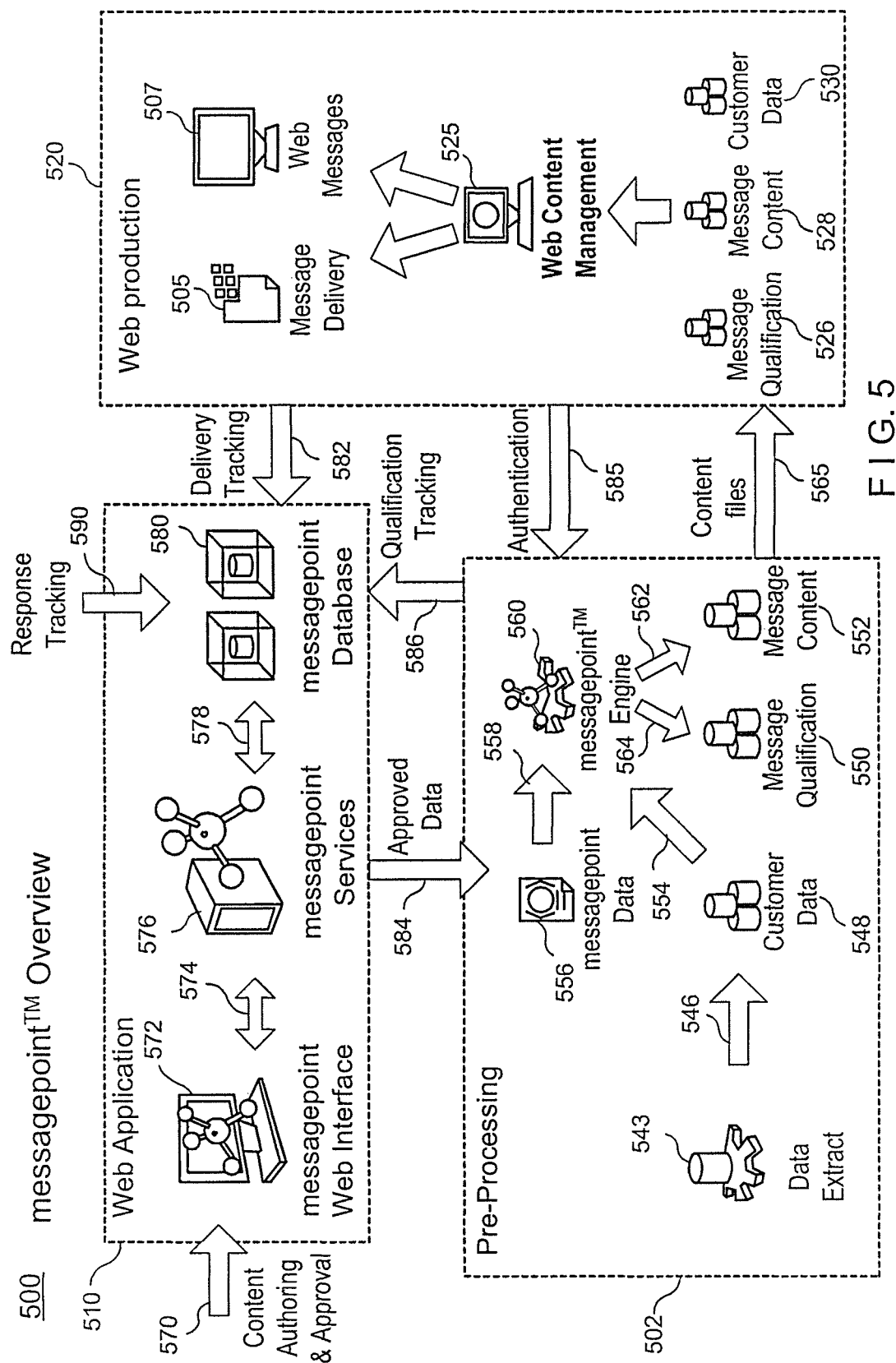
FIG. 5 illustrates an embodiment of the present invention that utilizes web content management.

FIG. 5 illustrates an embodiment of the present invention that utilizes web content management. System 500 includes a pre-processing module 502, web production module 520 and web application module 510.

Pre-processing module 502 includes data extraction module 543 which extracts a subset of customer data for the purposes of formatting a web page with information relevant to the authenticated web site visitor. Extracted data is provided to customer data module 548. The customer data is provided to messagepoint engine module 560 via channel 554.

Approved data is provided from web application module 510, as shown by channel 584. The approved data is data that has been approved for transmission to members of the target audience. Qualification tracking is transmitted from pre-processing module 502 to web application module 510 via channel 586. The qualification tracking shows that that in response to a customer web site visit, that one or more pieces of dynamic message content were qualified for delivery to the authenticated web site visitor.

The messagepoint engine module 560 also receives message data from messagepoint data module 556 via channel 558. The messagepoint engine module 560 generates message data and provides the message data to message qualification module 550 via channel 564 and message content module 552 via channel 562.

The content data is the transmitted to web production module 520 via channel 565.

Web production module 520 receives content files from pre-processing module 502, via channel 565 and stores the content files in one of a plurality of storage units. These storage units include message qualification memory 526, message content memory 528 and customer data memory 530. These memory, or storage units, 526, 528 and 530 provide data to web content management module 525.

The web content management module 525 utilizes the provided information and identifies one or more appropriate touchpoints to transmit the message data. For example, FIG. 5 shows message delivery touchpoint 505 and web message touchpoint 507.

Authentication data, generated by the web content management module 525 is provided to the pre-processing module 502 via channel 585.

Additionally, delivery tracking information is provided from customer touchpoints 505 and 507 to web application module 510 via channel 582. The tracking information is based on feedback from customers at the touchpoints 505 and 507.

The feedback data, or delivery tracking data is received by web application module 510. The web application module 510 also receives content authoring and approval data via channel 570. Messagepoint web interface 572 is typically a GUI that is in bi-directional communication with messagepoint services module 576. Messagepoint services module 576 also communicates with messagepoint database module 580 via bi-directional communication channel 578. The messagepoint services module 576 generates message data, which has been approved and provides the message data to pre-processing module 502. Messagepoint database 580 stores data that is used to generate the message data. Response tracking data 590 is also provided to the web application module 510. The response tracking data is also used to generate and/or edit the message data.

FIG. 6 shows an example of a customer touchpoint 600 according to an embodiment of the present invention. As shown in FIG. 6, the customer touchpoint is a printed document that may be included in a customer's monthly financial statement. The touchpoint 600 has first text portion 640, second text portion 650, first graphic data portion 642 and second graphic data portion 652.

First text portion 640 displays message data tailored to the particular customer. The determination of the content of the text displayed in first text area 640 is based on customer profile data and approved content, as described herein.

Second text portion 650 also displays authorized content or message data that is a function of the customer profile and other criteria.

First graphic portion 642 and second graphic portion 652 are populated with graphic data that have been determined and selected based on profile data of the particular customer. For example, the text in first text portion 640 is directed to a long-term saving strategy for a working individual. The graphic depicted in first graphic portion 642 shows a relatively young woman. Thus the text and graphic data have been selected to specifically target a particular customer or group of customers that fit into a particular profile. The profile may be for example single females between 25 and 35 years of age with an average annual income of between $30,000 and $50,000.

Similarly, second txt portion 650 may also display other text that is directed to the same demographic population. Furthermore, second graphic portion 652 shows a selected graphic based on the profile of the customer. Indeed, the graphic of a woman climbing a ladder is directed to a customer with a large percentage of their working years ahead of them, as opposed to a customer near retirement age.

Figure 7:

FIG. 7 shows another example of a page of material 700. This material 700 may be displayed on a web page touchpoint and/or a printed statement touchpoint for a customer's account. The material 700 includes value of investment portion 720, allocation portion 722, investment details portion 724, account information 740 and dynamic portion 730.

Value portion 720, allocation portion 722 and detail portion 724 provide balance, allocation and other account information directed to the assets in the account. These portions may be referred to as static portions since the content is not based on message data that is updated. Account information portion 740 provides information about the date the account was opened and the owner of the account. Dynamic portion 730 is a portion of the touchpoint that displays selected data based on the customer profile data. This dynamic portion 730 is different based on the message data generated for the particular customer.

Figure 8:

FIG. 8 shows another example of touchpoint materials 800. Touchpoint materials 800 may be, for example, a first page of an investment report. This report may be mailed to the customer, emailed to the customer or made available to the customer via a web site. Static portion 805 shows that customer's name and address. Static portion 810 shows the account number, owner name and date account was opened. Portion 822 shows the asset balance and changes in the asset balance since the previous reporting period. Dynamic portion 820 is embedded in the touchpoint materials 800 in a preselected location and the content of the message data displayed in the dynamic portion 820 is based on the user profile data and message data generated as described herein.

Figure 9:

FIG. 9 shows another example of touchpoint materials 900. Touchpoint materials 900 may be, for example, portions of an investment report. This report may be mailed to the customer, emailed to the customer or made available to the customer via a web site. Static portion 905 shows that customer's name and address. Static portion 910 shows the account number, owner name and date account was opened. Portion 922 shows the value of the customer's assets, performance, asset balance and changes in the asset balance since the previous reporting period. Dynamic portion 920 includes text that is embedded in the touchpoint materials 900 in a preselected location and the content of the message data displayed in the dynamic portion 920 is based on the user profile data and message data generated as described herein.

Figure 10:
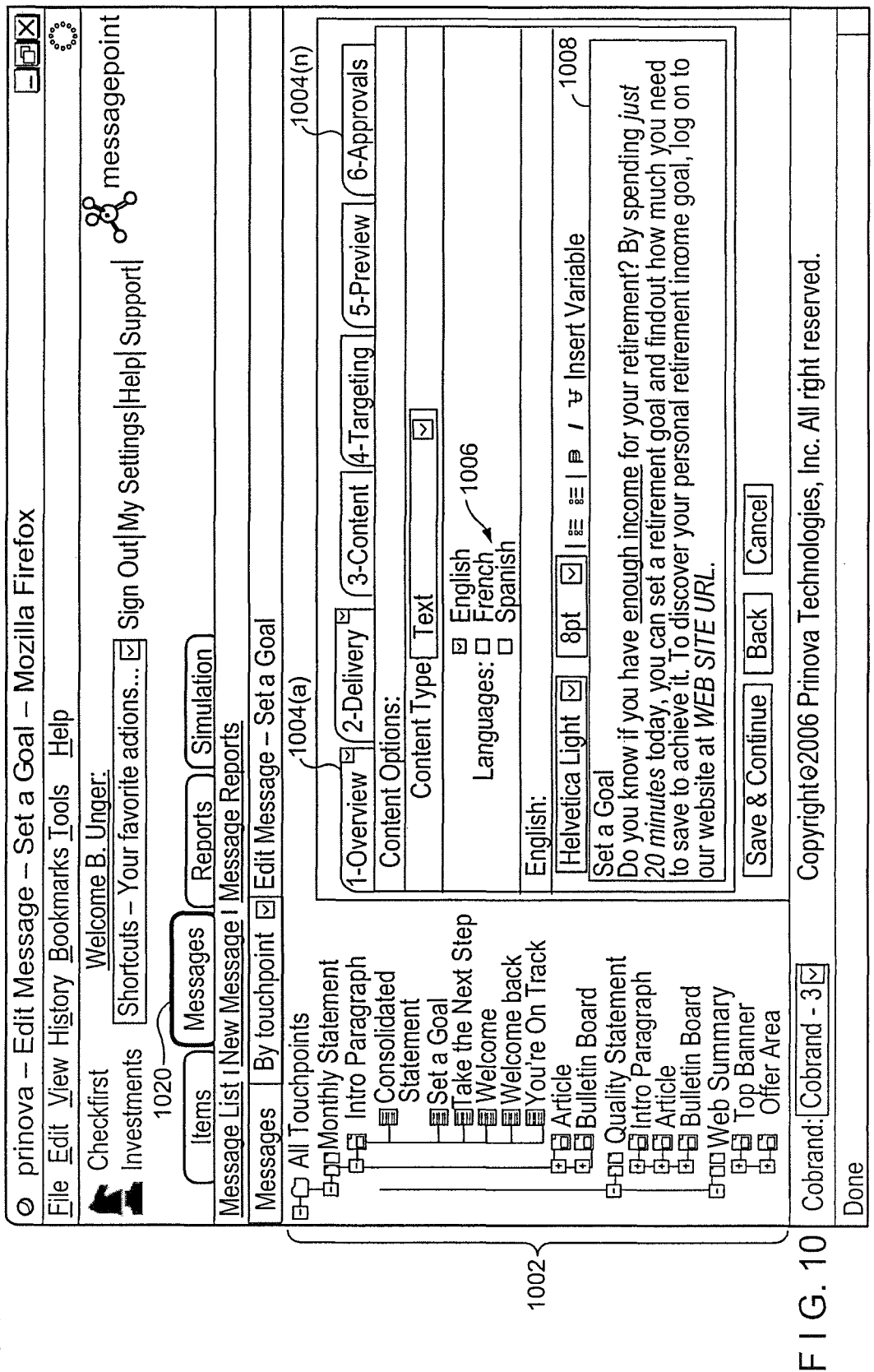
FIGS. 10 and 11 illustrate input graphical user interfaces (GUIs) according to an embodiment of the present invention.

FIG. 10 shows an example of a GUI that may be used to generate message content for a particular customer. As shown by screen shot 1000, "message" tab 1020 is shaded, indicating that the "message" menu is open. Portion 1002 shows that a drop-down menu identifies all touchpoints, the type of touchpoint, e.g., "monthly statement" and furthermore, the portions of the monthly statement e.g., "consolidated statement", "set a goal", "take a next step", "welcome", "welcome back" and "you're on track". Other outdents such as "article", are also shown.

Menu tabs 1004(a) . . . (n) (where "n" is any suitable number) are also shown. "Content" tab is shaded and shows that content options are available to the programmer, or user who is generating message data for a target audience member. Portion 1008 shows a text box that can be used to enter desired text that will be displayed to selected touchpoints of selected target audience members.

Figure 11:
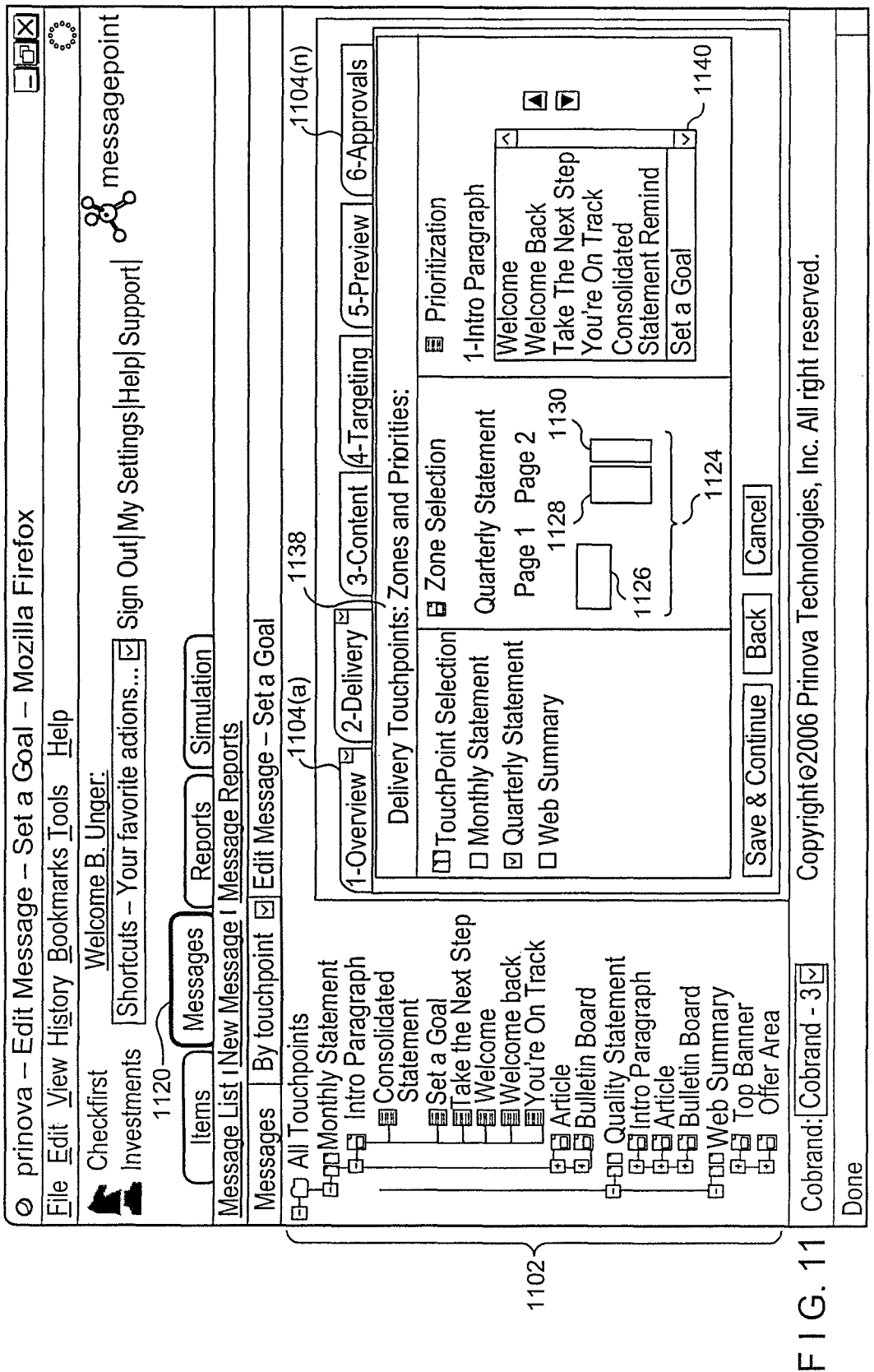

FIG. 11 illustrate input graphical user interfaces (GUI) 1100 according to an embodiment of the present invention. The GUI 1100 may be used to generate message content and design a display arrangement for a particular customer. As shown by screen shot 1100, "message" tab 1120 is shaded, indicating that the "message" menu is open. Portion 1102 shows that a drop-down menu identifies all touchpoints, the type of touchpoint, e.g., "monthly statement" and furthermore "Intro Paragraph", the portions of the monthly statement e.g., "consolidated statement", "set a goal", "take a next step", "welcome", "welcome back" and "you're on track". Other outdents such as "article", are also shown.

Menu tabs 1104(a) . . . (n) (where "n" is any suitable number) are also shown. "Delivery" tab is shaded and shows that delivery options 1138 are available to the programmer, or user who is generating message data for a target audience member. Portion 1140 shows a selection box that can be used to set a heading in the "Intro Paragraph". The selection "Set a Goal" is shaded, so referring back to FIG. 10, a programmer or user may input text for that portion of the statement. This text will be displayed to selected touchpoints of selected target audience members.

Portion 1124 includes regions 1126, 1128 and 1130, which represent areas of a statement that will be displayed to a customer via a touchpoint. Region 1126 shows an area that will be displayed on page 1, while regions 1128 and 1130 show areas that will be displayed on page 2.

Figure 12:
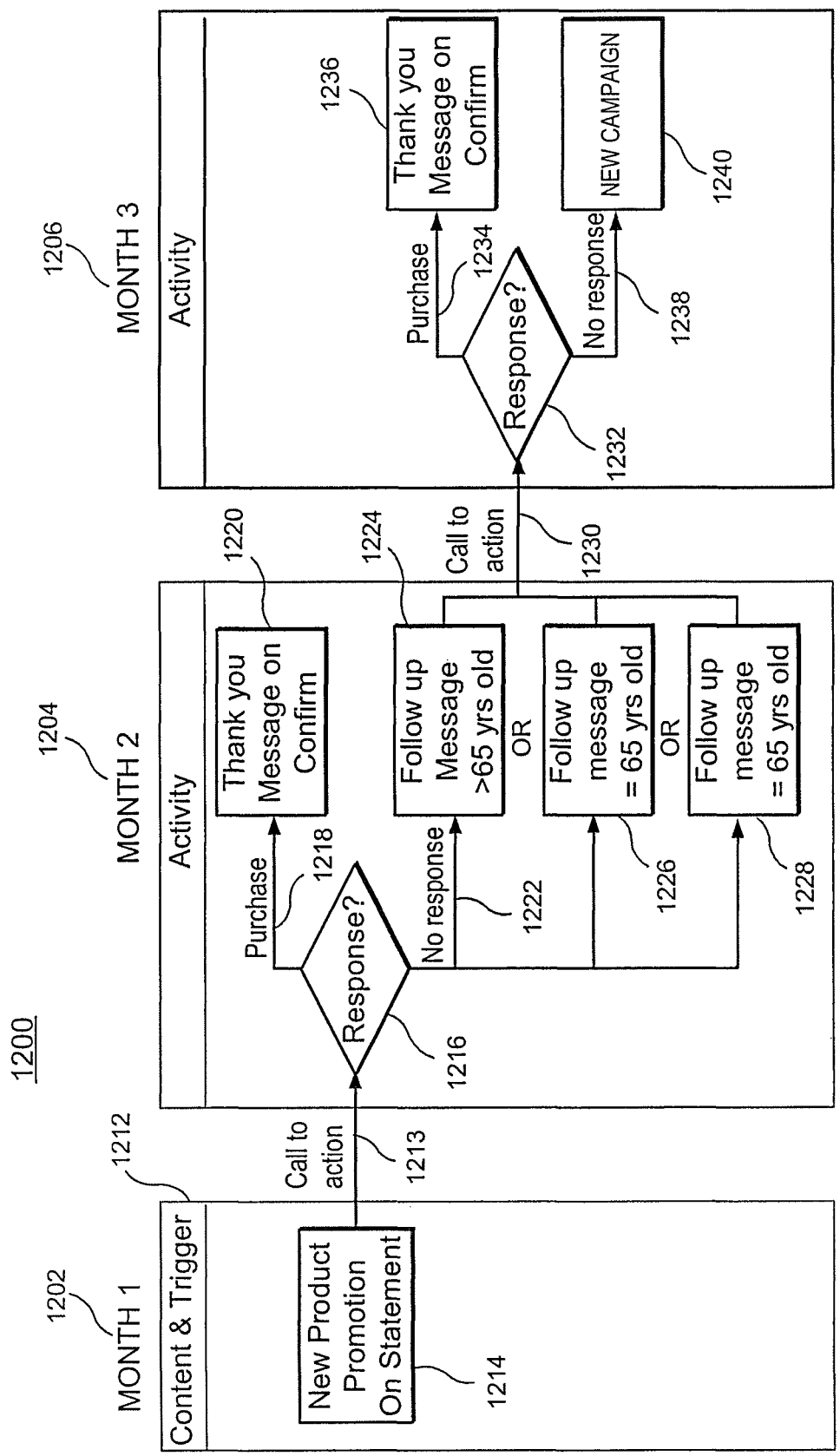
FIG. 12 illustrates a process according to an embodiment of the present invention.

FIG. 12 illustrates a process 1200 according to an embodiment of the present invention. Content and trigger 1212 is shown in month 1, 1202. At this stage new products can be introduced or promoted on a statement or other touchpoint, as shown by 1214.

Month 2, 1204 shows that activity is occurring. Call to action arrow 1213 leads to a determination of whether there has been a response from a customer, as shown in step 1216. Line 1218 shows that a purchase has been made based on the new product promotion of step 1214. A "thank you" message is then provided to the customer, as shown by 1220.

Alternatively, if no response is received, line 1222 shows that a follow-up message can be generated. Steps 1224, 1226 and 1228 show that the message generated is based on the age of the particular customer or member of the target audience.

Line 1230 shows a second call to action based on the follow-up and step 1232 determines whether or not there is a response. This occurs at the start of the month 3 time period 1206.

Line 1234 shows that a purchase has been made based on the follow-up message of step 1224, 1226 or 1228. A "thank you" message is then provided to the customer, as shown by 1236.

Alternatively, if no response is received, line 1238 shows that a new campaign can be generated 1240.

Another embodiment of the present invention is a Messaging and Campaign Simulator that allows business users to manage virtual production runs to test and measure the performance of planned messages and campaigns. Allows business and operations a predictive process to assess cost drivers such as insert order quantities and page counts.

Customer Correspondence Management—Allows business users to manage templates and author ad hoc correspondence such as letters and process through a workflow for approval into production through existing document generation systems.

Customer Preference Management—Allows the capturing of customer profiles and preferences for customized communications and content driven by customers themselves rather than predictive or arbitrary algorithms.

Customer Service Portal—Provides front line customer staff with access to messages and other message attributes to further reinforce the message and track "calls to action". Tracked message information and content is available via messagepoint front end or via integration to existing customer service systems and infrastructure.

Another embodiment of the present invention is directed to a method of using a computer system to provide at least one tool for personalized communications to a large customer population.

Yet another embodiment of the present invention is directed to a method of using a computer system to provide tools to business and marketing users for managing, tracking and measuring dynamic customer-targeted messaging campaigns across both print and electronic channels.

Yet another embodiment of the present invention is directed to a modular software system for enterprises for managing, tracking and measuring dynamic customer-targeted messaging campaigns across both print and electronic channels, with modules integrating core Another embodiment of the invention delivers support to front line staff and customer service by providing messaging information on customers they speak to, by providing scripts to further reinforce the messages, by delivering the capability to capture customer responses, and by integrating with archive systems to view customer documents.

In one embodiment, the invention provides the first enterprise system for Customer Touchpoint Management (CTM) for marketing and product managers to manage, track and measure one to one communications with their customers. The invention may be implemented in industries such as, for example, financial services, banking, health care, retail, utilities, telecommunications, e-commerce transactions, Internet or online auctions, Internet or online purchases, Internet or online sales, Internet or online gaming, and insurance. Features of the invention may include, for example:

- an agnostic enterprise CTM solution, compatible with multiple document composition technologies;
- scalable, high volume processing capability to deliver complex, customer messaging to a variety of message delivery formats and channels;
- message authoring by the business and marketing people; and
- full functionality in a distributed environment.

The system may be implemented on enterprise servers, web-based servers, and personal computers, laptop computes, hand held devices (e.g., PDAs) or any processing module with adequate processing functionality and memory capacity:

In one embodiment, the invention is implemented in software and is referred to herein as Messagepoint™ (Messagepoint™ is a registered trademark of PRINOVA Software Inc. a corporation of Toronto Canada). Table 1 illustrates the positioning of Messagepoint™ in relation to source systems (customer relationship management, data/transaction systems, electronic content management, web content management) and delivery channels (web, document composition, email, customer service/front line staff).

In terms of process flow and architecture, the system and method as embodied in Messagepoint™ provides:

Browser based features to manage and measure messaging campaigns including inserts;
Easy previewing of messages in the context of the customer touch point;
Campaign development and activity-based messaging;
Upstream integration with CRM, customer data systems and other content sources;
Downstream integration with traditional message delivery channels such as document composition engines, web and email delivery and customer service systems;
Message tracking and ROI (Return on Investment) performance integration;
Reporting tools to expedite statistical analysis;
Simulation sandbox to conduct what-if impact analysis and campaign testing; and
Customer service/call center integration including links to document archiving.

Table 1 is a table that sets out example module functionality. The modular nature of the invention provides at least the following components:

| Module | Business Driver |
| --- | --- |
| Message Management & Workflow | Distributed process to manage content, triggers and locations for messages for one or more communication applications and one or more users. |
| Message Reporting & Analytics | Allows business users to easily view statistics and measure the performance of their messages and campaigns. |
| Campaign & Activity-based messaging | Allows business users to link messages together and/or trigger qualified messages based on the workflow (result) of a previous message. |
| Messaging and Campaign Simulator | Allows business users to manage virtual production runs to test and measure the performance of planned messages and campaigns. Allows business and operations a predictive process to assess cost drivers such as insert order quantities and page counts. |
| Physical Insert Management | Allows business users to manage content, triggers and locations for physical inserts as well as inline messages. |
| Customer Service Portal | Allows customer service/front line customer interface with access to messages and other message attributes to further reinforce the message and track "calls to action" |
| Customer Correspondence Management | Allows business users to author ad hoc correspondence such as letters and process through a workflow for approval into production. |
| Customer Preference Management | Allows the capturing of customer profiles and preferences for customized communications and content driven by customers themselves rather than predictive or arbitrary algorithms. |
| Message Delivery Connectors | The connectors represent the delivery channel options to deliver message content to one or more recipients. The connectors deliver relevant, active messages in appropriate priority order to production message delivery systems and return delivery and/or response data back to messagepoint ™ for tracking purposes. As each delivery connector may present the content in a manner appropriate to the medium, each connector will implement its own preview, test and message delivery simulation processes. |

Table 1 also shows the deployment of Messagepoint™ on an engine functional platform, including modes of deployment, supported operating systems and databases.

The web and engine platforms may be deployed on server hardware hosted by the provider of Messagepoint™, or on hardware hosted by the customers themselves.

Each delivery channel for targeted communications represents another "connector" module and integration services. Connector modules facilitate initial integration between the invention and other third party systems. This can be accomplished by direct partnerships with third party vendors and interfacing with their proprietary systems. Alternatively, connector modules can be limited to third party vendors' published API (application programming interface) sets.

An additional benefit of this integration is the professional services revenue stream associated with an initial configuration for a customer. By establishing a Connector-based architecture, services costs can be reduced.

Examples of delivery channels include, but are not limited to:
a. Paper based channels
  i. Welcome kits
  ii. Direct mail
  iii. Inline messages on statements, invoices, trade confirms or other compliance documents the enterprise may send regularly
  iv. Envelope inserts
  v. Ad hoc mailings
b. Electronic
  i. Electronic document presentment
  ii. Web pages (Web content management)
  iii. Email marketing
c. Interpersonal
  i. Broker/Advisor interactions
  ii. Customer Service The modular approach of this invention ensures that as real world user needs are identified, they can be integrated into the existing system. Moreover, the present system allows for modular integration of support for any third party technologies.

Furthermore, the present system provides for a repository of record for message content and tracking data.

A person skilled in the art would appreciate that numerous modifications of the present invention are possible in light of the above description. While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention.

What is claimed is:

1. A system for content delivery to one of a plurality of touchpoints, the content comprising a first message, and one of a second message and a third message, the system comprising:
    a web environment module including: a web interface comprising a graphical user interface (GUI) for receiving content authoring and approval data, a database storing data used to generate message data, and a services module in bi-directional communication with both the web interface and the database for generating approved message data based on the content authoring and approval data and based on the data stored in the database;
    a pre-processing module for receiving approved message data from the web environment module, the pre-processing module comprising a data extraction and normalization module for extracting and normalizing approved message data, a statement driver file module for providing normalized data from the normalization module, a message point engine module for receiving the normalized data and providing message data based on the normalized data, the pre-processing module providing composition files;
    a composition module for receiving the composition files from the pre-processing module and storing the content files in one of a plurality of storage units, the composition module utilizing the content files data from the plurality of storage units and identifying a touchpoint to transmit the subset of pre-processed approved message data to;
    a customer correspondence management module for managing templates and authoring ad hoc correspondence and process the correspondence through a workflow for approval into production through the composition module; and
    a connector providing an interface to said touchpoints, said connectors delivering active messages in priority order to a production message delivery system and returning delivery or response data for tracking purposes,
    wherein the system for content delivery is implemented on one or more of each of: an enterprise server, a web-based server, a personal computer, a laptop computer, and a handheld computing device;
    wherein the touchpoints comprise a message delivery touchpoint, a document output touchpoint, and an electronic document output;
    wherein the plurality of storage units comprise a message qualification memory and one or more of: a message content memory, and a customer data memory;
    the system performing the steps of:
        sending said first message to a customer;
        checking for response data associated with said first message;
        determining that such response data has been received; and targeting active messages for said touchpoints based on said response data such that the second message is triggered based on the response data resulting from the first message;
        determining a profile for the customer, the profile indicative of income and whether the customer has a large percentage of future working years ahead; and
    including, in the second message, a graphic portion populated with graphic data selected based on the profile.

2. The system of claim 1, wherein the touchpoint provides delivery tracking to the web environment module based on feedback at the touchpoint.

3. The system of claim 1, wherein the composition module comprises a document composition engine.

4. The system of claim 3, wherein the document composition engine identifies the touchpoint.

5. The system of claim 1, the interface provided by the connector comprises an application programming interface (API) published by a third party.

6. The system of claim 1, wherein said checking of response data is performed monthly.

* * * * *